US008938683B2

(12) United States Patent
Bentrup

(10) Patent No.: US 8,938,683 B2
(45) Date of Patent: Jan. 20, 2015

(54) VISUAL STATE COMPARATOR

(75) Inventor: Keith Bentrup, Eagleville, PA (US)

(73) Assignee: eBay Inc., San Jose, CA (US)

(*) Notice: Subject to any disclaimer, the term of this patent is extended or adjusted under 35 U.S.C. 154(b) by 192 days.

(21) Appl. No.: 13/610,082

(22) Filed: Sep. 11, 2012

(65) Prior Publication Data

US 2014/0075344 A1 Mar. 13, 2014

(51) Int. Cl.
G06F 3/00 (2006.01)

(52) U.S. Cl.
USPC .......................................... 715/760; 715/838

(58) Field of Classification Search
CPC ................................ H04L 67/02; H04L 67/38
USPC ................................................... 715/760, 838
See application file for complete search history.

(56) References Cited

U.S. PATENT DOCUMENTS

| 6,918,066 B2 * | 7/2005 | Dutta et al. ..................... 714/46 |
| 2010/0211893 A1 * | 8/2010 | Fanning et al. ............... 715/760 |
| 2012/0210236 A1 * | 8/2012 | Prasad ........................... 715/738 |
| 2013/0182949 A9 * | 7/2013 | Pankratius ..................... 382/165 |
| 2013/0212461 A1 * | 8/2013 | Sarangapani et al. ........ 715/234 |

OTHER PUBLICATIONS

Cross Browser Testing: A detailed Review of Tools and Services by Demiurg. Available Jun. 6th, 2010 through the Internet Archive Wayback Machine at https://web.archive.org/web/20100606061009/http://www.smashingmagazine.com/2010/06/04/cross-browser-testing-a-detailed-review-of-tools-and-services/.*

* cited by examiner

Primary Examiner — Omar Abdul-Ali
(74) Attorney, Agent, or Firm — Schwegman Lundberg & Woessner, P.A.

(57) ABSTRACT

In various example embodiments, systems and methods for providing visual state comparisons is provided. In example embodiments, parameters are received from a user device of a user. The parameters indicate different browser/operating system combinations for a visual comparison of screenshots of a state for the different browser/operating system combinations. Based on the different browser/operating system combinations indicated by the parameters, the screenshots along with corresponding metadata for each indicated browser/operating system combination are retrieved. A user interface that visually compares at least two retrieved screenshots is provided to the user device. The user interface includes a display of the corresponding metadata for the at least two retrieved screenshots.

20 Claims, 9 Drawing Sheets

VISUAL STATE COMPARATOR

FIELD

The present disclosure relates generally to data processing, and in a specific example embodiment, to providing a visual state comparator.

BACKGROUND

Oftentimes, developers and quality assurance (QA) personnel want to test how an application will be displayed on different browsers and operating systems. These personnel may individually capture screenshots from each combination of browsers and operating systems, and view the screenshots one at a time.

BRIEF DESCRIPTION OF DRAWINGS

Various ones of the appended drawings merely illustrate example embodiments of the present invention and cannot be considered as limiting its scope.

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

In example embodiments, systems and methods for providing visual state comparisons are provided. In example embodiments, parameters are received from a user device of a user. The parameters indicate different browser/operating system combinations for a visual comparison of screenshots of a state for the different browser/operating system combinations. Based on the different browser/operating system combinations indicated by the parameters, the screenshots along with corresponding metadata for each indicated browser/operating system combination are retrieved. A user interface that visually compares at least two retrieved screenshots is provided to the user device. The user interlace includes a display of the corresponding metadata for the at least two retrieved screenshots.

By using embodiments of the present invention, a user may easily and quickly identity visual differences of webpages for different browsers and operating systems. The user does not need to generate and individually review each screenshot in isolation. Therefore, one or more of the methodologies discussed herein may obviate a need for time consuming data processing by the user. This may have the technical effect of reducing computing resources used by one or more devices within the system. Examples of such computing resources include, without limitation, processor cycles, network traffic, memory usage, storage space, and power consumption.

Figure 1:
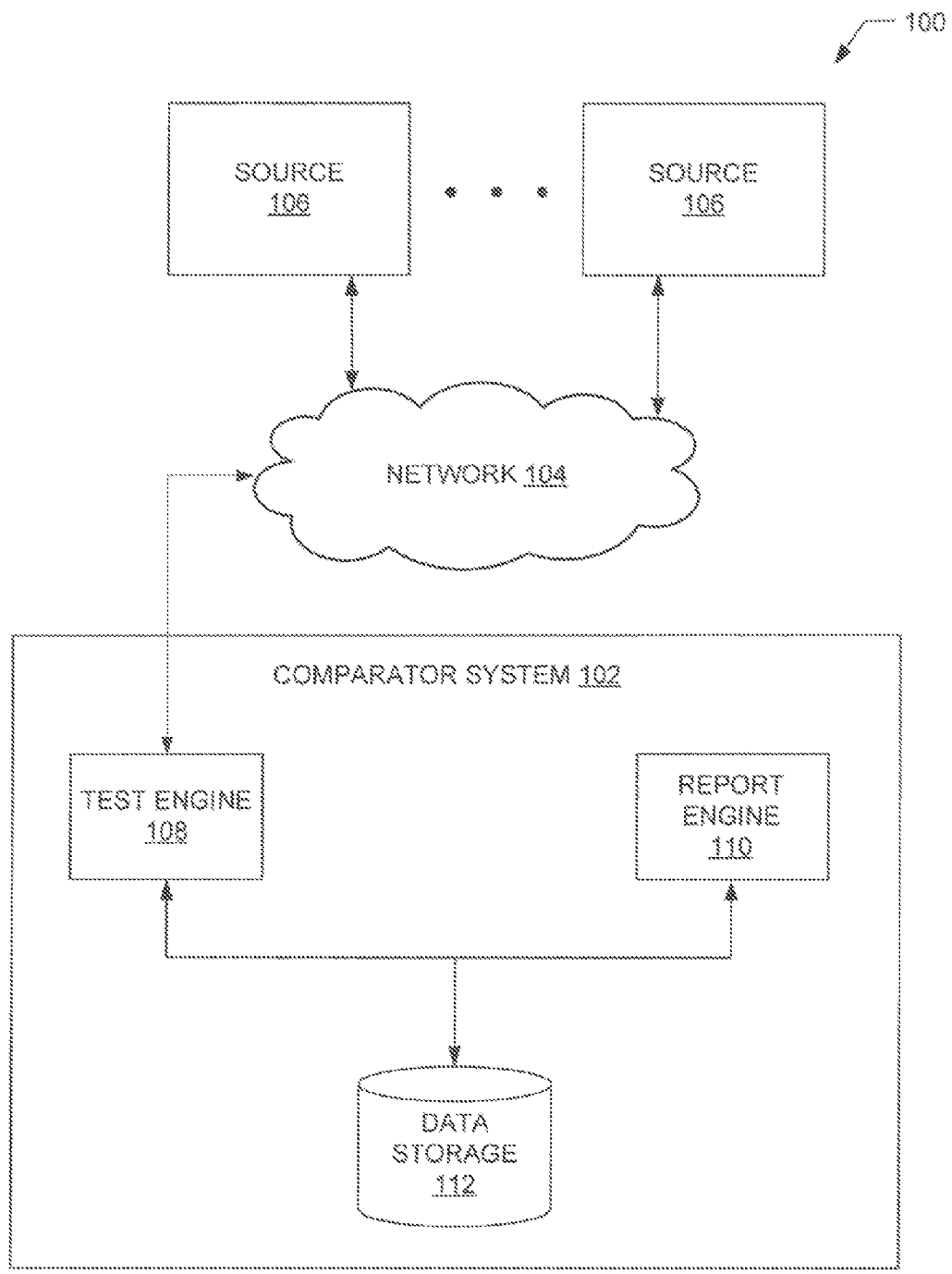
FIG. 1 is a block diagram illustrating an example environment in which embodiments of a system for providing a visual state comparator may be implemented.

FIG. 1 is a block diagram illustrating an example environment 100 in which embodiments of a system for providing a visual state comparator may be implemented. In example embodiments, a comparator system 102 is coupled via a network 104 (e.g., the Internet, wireless network, cellular network, or a Wide Area Network (WAN)) to a plurality of sources 106. The sources 106 may comprise web servers of various websites for which the comparator system 102 is to perform visual state comparisons. For example, the source 106 may be a server for an online store that sells computer products. The comparator system 102 may be configured to test various applications running on different combinations of browsers and operating systems for uniformity. The application may be, in one example, a web-based process. These applications may includes for example, a checkout application (e.g., webpages of a checkout flow), a registration application (e.g., webpages of a process to register with the online store), or a search application (e.g., webpages for a particular search process).

To enable the comparator system 102 to provide visual state comparisons, the comparator system 102 comprises a test engine 108 and a report engine 110. The test engine 108 allows a user (e.g., a developer or QA personnel) of the comparison system 102 to generate and run tests. The test results in captured metadata and screenshots of various states of a build for different browsers and operating systems. A build is based on a change in code which may result in a different version of webpage(s) for the web-based process. The states may comprise the various pages (e.g., screenshots) of the web-based process or states within the pages.

The test results (e.g., captured screenshots and corresponding metadata) are stored to a data storage 112. Subsequently, the report engine 110 accesses the data storage 112 in retrieve specific metadata and screenshots and provides the results to a device of the user for visual comparison. In example embodiments, the visual comparison may be presented in a side-by-side view or in an overlay view. The test engine 108 and the report engine 110 will be discussed in further detail below.

The environment 100 may comprise other components that are not shown. In general, components, protocols, structures, and techniques not directly related to functions of example embodiments or that are optional have not been shown or discussed in detail. For example, a proxy device may be included in the environment 100 for managing modifications to headers as will be discussed in more detail below. However, this proxy device is optional.

Figure 2:
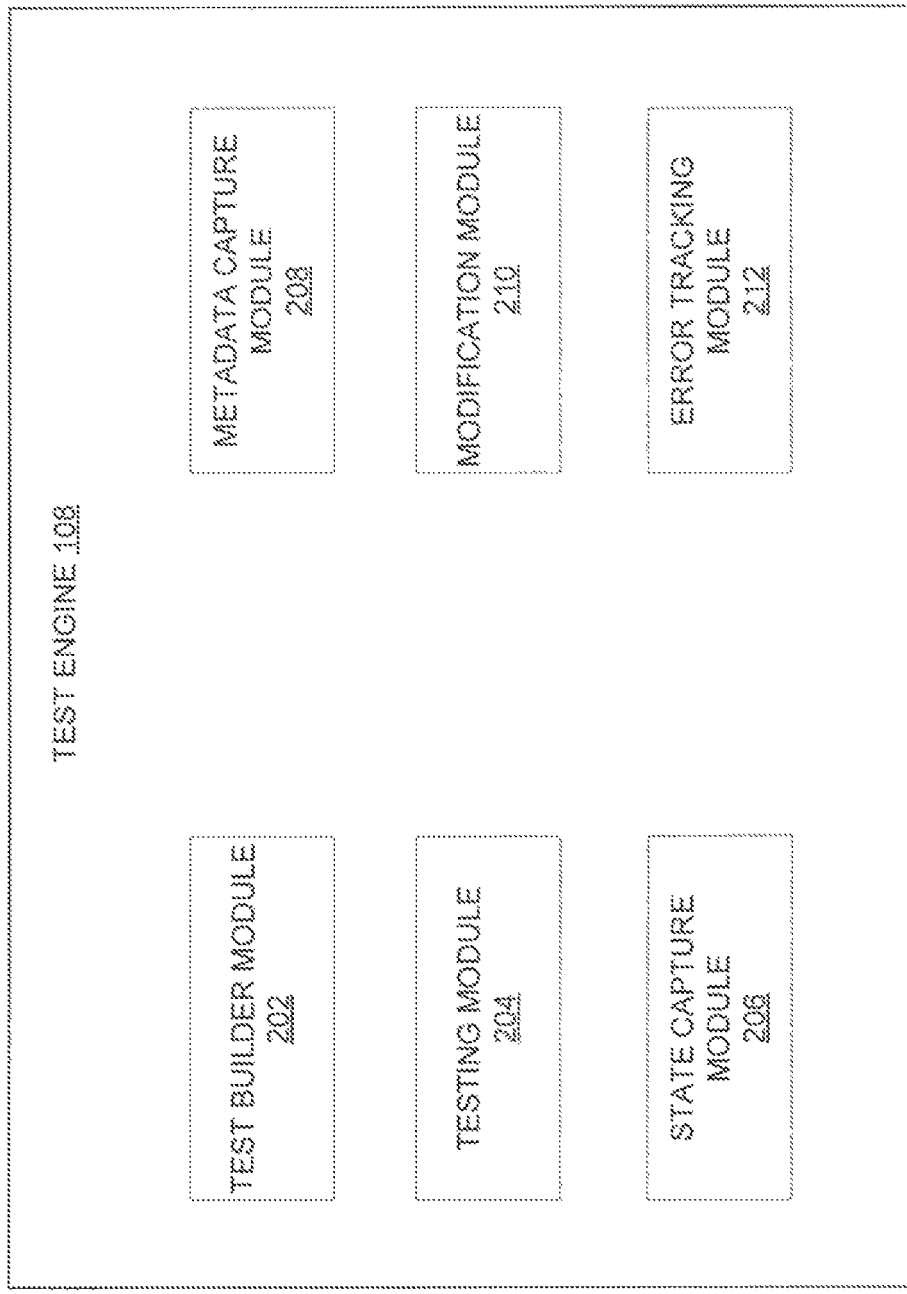
FIG. 2 is a block diagram of an example embodiment of a test engine.

FIG. 2 is a block diagram of an example embodiment of the test engine 108. The test engine 108 generates and runs tests of various builds of the application under test and applications for different browsers and operating systems. In example embodiments, the test engine 108 comprises a test builder module 202, a testing module 204, a state capture module 206, a metadata capture module 208, a modification module 210, and an error tracking module 212. Alternative embodiments may comprise more or less modules, combine functionality of modules, or locate modules in a different location.

The test builder module 202 allows a user (e.g., developer or QA personnel) to create tests to be run against various web applications for different browsers and operating systems. In example embodiments, the user indicates steps in the test to the test builder module 220. In one example, the user may use Selenium (or other web application testing automation tools) to provide code for the test builder module 202. The user may also provide, to the test builder module 202, parameters that are both configurable and fixed for the test. For example, for a checkout process test a starting product URL (Uniform Resource Locator) may be indicated as a configurable parameter in the test. Based on the various user inputs, the test builder module 202 generates each test. The test is then stored for later use. In one embodiment, the generated test may be stored to the data storage 112. It is noted that any number of tests may be generated and stored at any time prior to running the tests (e.g., allowing far batching of tests).

The testing module 204 sets up the test to be run by receiving parameters for the test from a user (e.g., developer or QA personnel). The user running the test may be the same or different from the user that created the test. For example, the user provides the start URL to the testing module 204 and indicates different browsers and operating system combinations that the test is to be run against. The user may also provide a height and width of the browsers to be compared. Other parameters, as established by the user creating the tests, are also contemplated and may vary for each test. In example embodiments, the parameters are parsed into the different steps of the test by the testing module 204. In one embodiment, a fetch URL test may be performed in which a plurality of URLs is provided to the testing module 204.

The testing module 204 triggers the state capture module 206 and the metadata capture module 208 to perform the test using the various parameters. The test may be run across multiple actual and virtual machines.

The state capture module 206 captures screenshots of a particular page (e.g., state) of the web application being tested for each indicated browser and operation system combination. That is, the state capture module 206 may open a web page or software application in multiple configurations of operating systems and browsers, and captures screenshots for comparison so that the user can see if the web page or software application is broken or misaligned on certain browsers. For example, a checkout application will have a particular checkout flow. A first state of the checkout application will be a product page. The next slate or page may include a cart with the product selected. Accordingly, the next state may be an order form (e.g., for input of customer information) and include an error messaging associated with the form. Subsequently, a confirm state and a print receipt state may follow. After the checkout process is completed, the test may return to an account state to check an order history to ensure the order is present. Accordingly, during a multi-step flow, the state capture module 206 captures different points in time (e.g., the different states) of the process for each selected browser/operating system combination. The captured screenshots are stored to a data store (e.g., data storage 112) by the state capture module 206.

The metadata capture module 208 captures metadata for each state of each browser/operating system combination. The metadata may be captured before and during the running of the test (e.g., while the state capture module 206 is capturing screenshots). The metadata for each state may include, for example, the URL, the browser being used, a build number, an operating system, page/state titles chosen by a tester, server headers, or server responses. The captured metadata are stored to a data store (e.g., data storage 112) by the metadata capture module 208.

The modification module 210 allows modification of headers between tests. The modifications are received from the user and sent to a proxy device before the test is run. For instance, the modification may instruct an Internet Explorer 8 (IE8) browser to run the test as if it were Internet Explorer 7 (IE7). This may be desirable, for example, for backward compatibility reasons. The testing may still be run against IE7 and IE8 to compare these to each other. However, a server (e.g., the source 106) may be instructed based on the modifications from the modification module 210 that for certain aspects of the test the modification should apply.

In another example, the user (e.g., developer) may be using a machine that is different in subtle ways than what is going to be out in production that another user (e.g., customer) sees. As such, the modification(s) may be sent to the server by the modification module 210 to tell the serve to behave differently so when the client (browser) visits, results based on the modification may be obtained. Accordingly, the user (e.g., developer) can compare a current environment during development to what the user thinks the environment will be during production.

In one embodiment, a proxy device performs the modification transmitted by the modification module 210. The modification may indicate a modified server header for the test. The proxy device may intercept a request and modify the request on-the-fly. For example, a webpage may have foreign language on it, but foreign language character sets may not be available. The server may be configured to tell IE8 to treat the foreign language as a normal character set. However, once the application (associated with the webpage) goes into production, the webpage may get a different character set. In order to compare the two states, in one test, the developer may get boxes where a Japanese character should be and in another test, the developer will see the Japanese characters. In one embodiment, the modification module 210 is the proxy device.

The error tracking module 212 tracks errors (e.g., JavaScript errors) during the rendering of the states. In capturing the screenshots, web page requests are run through a proxy (e.g., proxy device) that injects JavaScript code to capture and log JavaScript errors. Each screenshot can be captured with an error log that lists the URL and line numbers of any JavaScript errors. Thus, each time a JavaScript error occurs in a browser and state, the error is noted to a log by the error tracking module 212. The errors may be subsequently presented in a report. In one embodiment, whenever a JavaScript error occurs, the browser notes the error. At various intervals, the error tracking module 212 polls the browser to find out how many errors have occurred. The error tracking module 212 may note the state (e.g., cross-reference with testing data) and associate each error with the proper state.

Figure 3:
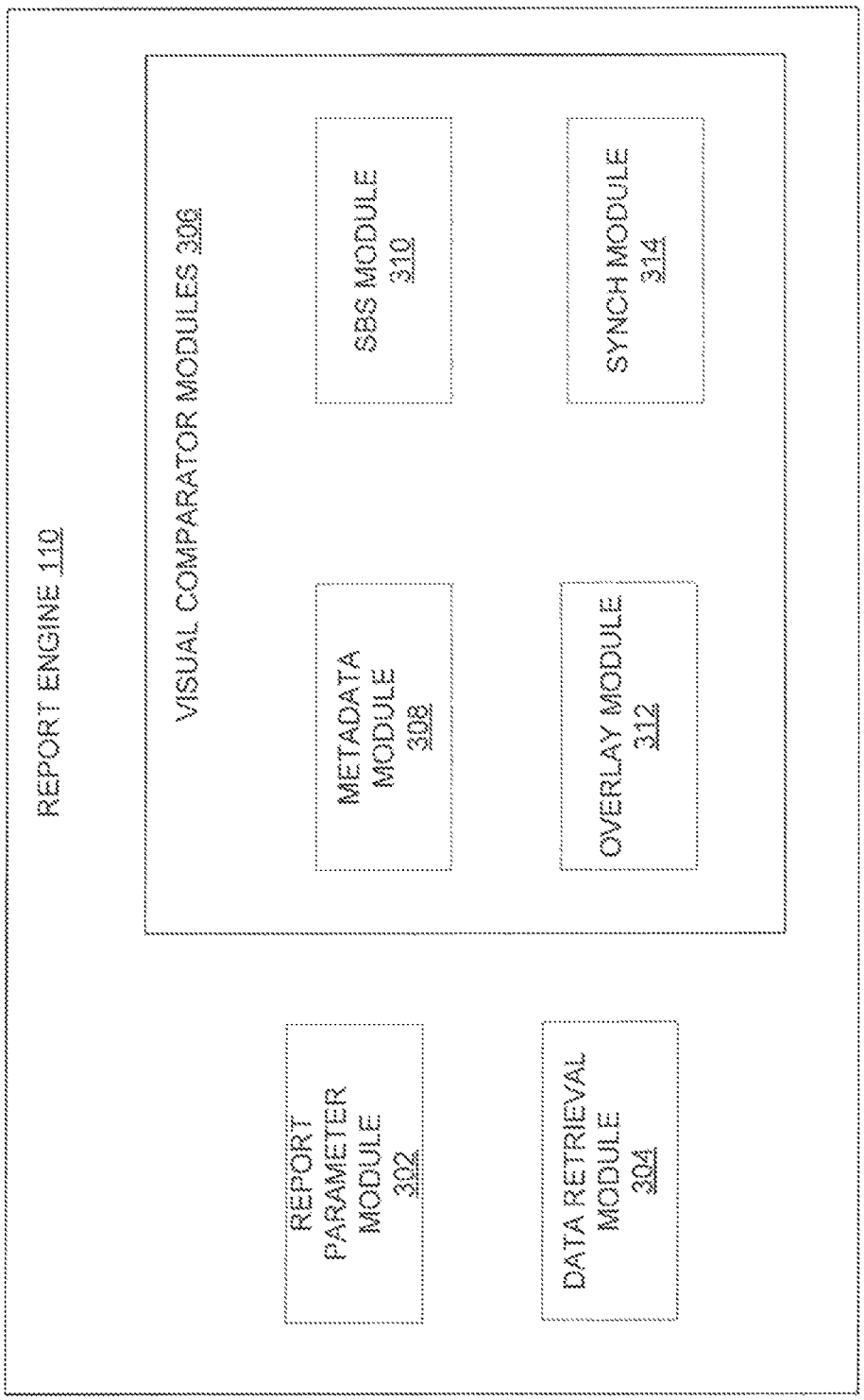
FIG. 3 is a block diagram of an example embodiment of a report engine.

FIG. 3 is a block diagram of an example embodiment of the report engine 110. The report engine 110 accesses the data storage 112 to retrieve stored metadata and screenshots for specific builds and browsers. These results are provided by the report engine 110 as visual comparisons. Accordingly, the report engine 110 comprises a report parameter module 302, a data retrieval module 304, and visual comparator modules 306.

The report parameter module 302 receives parameters to obtain data for a report that provides the visual comparison. As such, the report parameter module 302 provides a user interface that allows the user to select the build, web application, or other information to retrieve data associated with a test that has been performed.

Based on the parameters received by the report parameter module 302, the data retrieval module 304 accesses the data store (e.g., data storage 112) and retrieves the corresponding screenshots and metadata. More specifically, the data retrieval module 304 may send a series of requests for all the information (e.g., screenshots and metadata). For example, if the user selects a particular build number (e.g., #90), an immediate request is sent (e.g., via JAVA script) to go and retrieve all the screenshots and metadata for the particular build number. Thus, once a selection of the build, state, and browser/operating combination is received, the specific information based on parameters received by the report parameter module 302 is retrieved.

The visual comparator modules 306 format the retrieved screenshots and metadata for visual comparison. The visual comparators modules 306 determine which metadata goes with which screenshot and renders a visual comparison page that includes screenshots (also referred to as tabs on the visual comparison page). In one embodiment, the visual comparison page includes a magnifying glass. As the user mouses over a pure aspect of the tab, the magnifying glass magnifies a view so the user can do a quick dive of what one tab looks like compared to another tab. Accordingly, the visual comparator modules 306 comprise a metadata module 308, a side-by-side (SBS) module 310, an overlay module 312, and a synch module 314.

The metadata module 308 takes the metadata that was generated before and during the capture of each screenshot and uses the metadata in generating reports. For example, the metadata module 308 may identify that a particular screenshot is from a particular browser/operating system combination on a particular date for a specific build at a certain time. The metadata may also include information regarding a session, JAVA script errors, and network errors for each screenshot. This metadata may be displayed on the visual comparison UI to the user.

Figure 5:
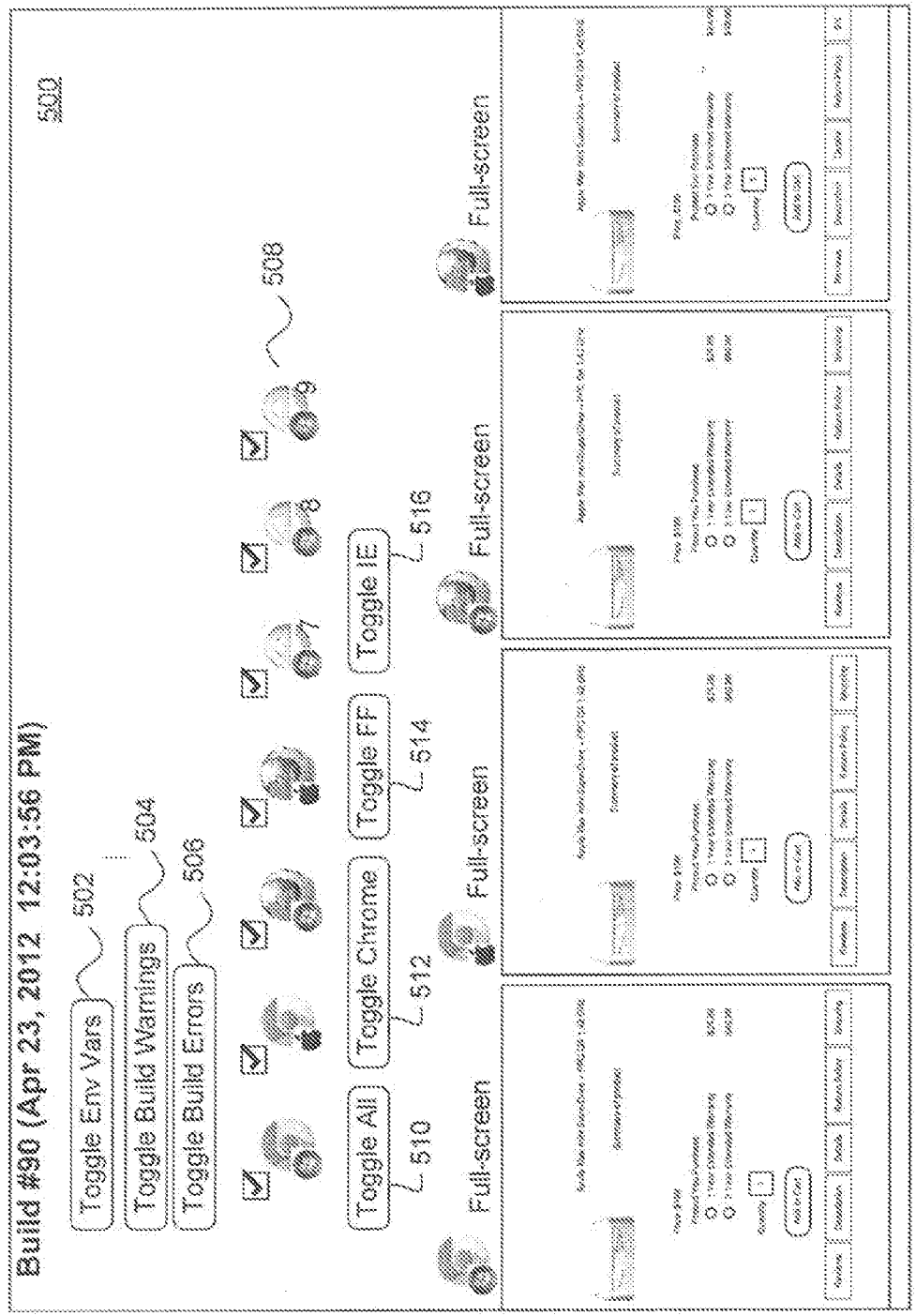
FIG. 5 is an example of a side-by-side visual comparison screenshot.

The SBS module 310 provides side-by-side visual comparison of tabs for rendering in a side-by side visual comparison user interface. The SBS module 310 may also provide various buttons on the user interface to allow the user in toggle between various tabs. In one embodiment, the tabs may be toggled based on specific browser/operating system types. An example of a side-by-side visual comparison user interface is shown in FIG. 5.

The overlay module 312 provides overlay visual comparison tabs for rendering in an overlay visual comparison user interface. The overlay module 312 may also provide an opacity slider to allow the user to adjust the opacity of a tab in comparison with another tab. Other tools may be provided by the overlay module 312 as will be discussed in more detail in connection with FIG. 6 below.

The synch module 314 manages the synching of screenshots between two or more comparisons. For example, a visual comparison may compare Build #91 for products in Chrome OSX and Build #91 on Firefox 3.6. Proceeding to a next visual comparison page, both screenshots (for Chrome OSX and Firefox 3.6) simultaneously change to reflect the next state in the web application. Ordinarily, the developer will want to keep the screenshots synched as the developer steps through and compares the screenshots within a web application. As such, synch maybe a user interlace default. However, there may be times when the developer does not want to keep the screenshots synched. For example, the developer may want to compare a form errors page to a page with no errors to see if the errors come in correctly. In another example, the developer may want to compare a tab in Build #90 to Build #91 to see if changes go in property or how much progress has been made.

Although the various components of the test engine 108 and the report engine 110 have been discussed in terms of a variety of individual modules and engines, a skilled artisan will recognize that many of the items can be combined or organized in other ways. Furthermore, not all components of the test engine 108 and the report engine 110 may have been included in FIGS. 2 and 3. In general, components, protocols, structures, and techniques not directly related to functions of example embodiments have not been shown or discussed in detail. The description given herein simply provides a variety of example embodiments to aid the reader in an understanding of the systems and methods used herein.

Figure 4:
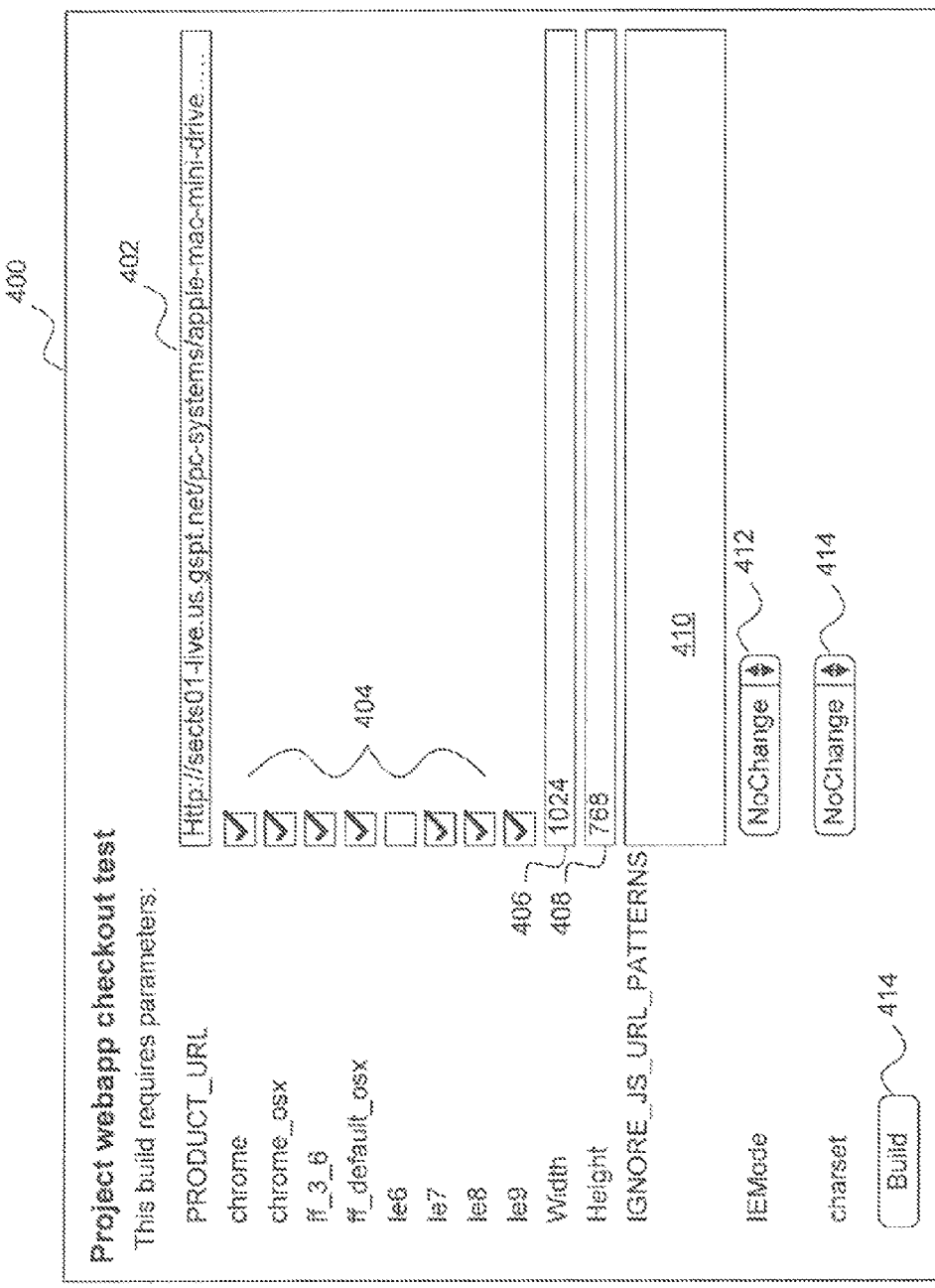
FIG. 4 is an example of a test parameter user interface.

FIG. 4 is an example of a test parameter user interface (UI) 400. The test parameter UI 400 may be provided by the testing module 204 to allow the user to set the parameters for a test. In the present example, the test is for a web application for a checkout process (e.g., to purchase a product). The test parameter UI 400 includes a starting product_URL field 402 where the user enters a start URL for the checkout test.

The test parameter UI 400 further includes checkboxes 404 for a plurality of different browsers that the test can be run against. The user may select the browsers to be tested by selecting the corresponding checkbox 404. For example, the user has selected to test Internet Explorer7 (IE7), Internet Explorer8 (IE8), and Internet Explorer (IE9), but Internet Explorer6 (IE6) is not selected. The user may also provide a width and height of the browsers to be compared in a width field 406 and height field 408, respectfully.

An ignore patterns field 410 allows a user to input a list of patterns matching URLs (e.g., JAVA script URLs) that should not trigger a build failure. For example, it may be useful to ignore errors caused by analytics or product reviews. Instead, these errors may be listed as warnings.

An IEmode field 412 allows the user to modify a server header for the test. As discussed above, the modification may be sent to the server by the modification module 210 to tell the server to behave differently. By selecting "NoChange," the server headers are unmodified.

A charset field 414 allows the user to set the charset value of a Content-Type response header returned from the server. The setting matches all requests with headers of Content-Type that match. By modifying the charset value of the Content-Type response header, the browser may interpret tests differently. This may be an important setting for internationalization. By selecting "NoChange," the server headers are unmodified.

Other parameters, as established by the user creating the tests, may be provided in the test parameter UI 400. That is, the user creating the test may establish the various parameters that are required, fixed, and changeable on the test parameter UI 400. Once all the required parameters are entered in the test parameter UI 400, the user may trigger the test by selecting the build button 414. In example embodiments, the parameters may be parsed into the different steps of the test by the testing module 204. Subsequently a user interface having multiple tabs may be provided to the user. Each tab shows a particular build and browser/operating system combination of a web page (e.g., state).

FIG. 5 is an example of a side-by-side visual comparison user interface 500 (herein referred to as "the SBS UI"), which allows the user to compare two or more tabs next to each other. The SBS UI 500 is provided to the user by the SBS module 310 based on the user selecting a SBS display mode.

Continuing with the test that was established with parameters in FIG. 4, the SBS UI 500 provides a visual comparison of Build #90 which was tested on Apr. 23, 2012 at 12:03:56 PM. As such the metadata module 308 is able to incorporate metadata (e.g., Build #90, test date of Apr. 23, 2012, test time of 12:03:56 PM) with the screenshots that were retrieved by the data retrieval module 304. As such, the SBS module 310 takes the various retrieved information and provides a visual comparison as shown in the SBS UI 500.

A toggle environment variables button 502 allows display or hiding of metadata about the test conditions and test parameters. In example embodiments, the default may be to hide the metadata without activation of the toggle environment variables button 502.

A toggle build warnings button 504 allows display or hiding of warnings that occur during the test. In example embodiments, the default is for warnings to be hidden without activation of the toggle build warning button 504.

A toggle build errors button 506 allows display or hiding of errors that occurred during the test. Errors may be more severe than a warning. In example embodiments, the default is for errors to be hidden without activation of the toggle build errors button 506.

The SBS UI 500 illustrates the various tabs of states retrieved for a particular test available for visual comparison. The tabs may be indicated by a browser icon along with a corresponding operating system icon. For example, a first available tab is based on a Chrome browser on a Windows operating system, while a second displayed tab is based on the Chrome browser on an OSX (Apple) operating system. The various combinations of browsers and operating systems available for visual comparison may be indicated in a selection area 508. In an initial SBS UI 500, a default may be to display all available combinations of browsers and operating systems. Subsequently, the user may untoggle or change a display of the SBS UI 500 by selecting or deselecting combinations in the selection area 508. Once the combinations are selected or deselected (e.g., by deselecting a corresponding checkbox), the user may select a toggle display button. As a result, the various selected tabs are displayed side-by-side for visual comparison as indicated by the selected toggle display button. For example, a toggle all button 510 will display all of the available tabs. A toggle Chrome button 512 will only display tabs associated with Chrome browser. Similarly, a toggle FF (FireFox) button 514 will only display tabs associated with FireFox, while a toggle IE button 516 will only display tabs associated with Internet Explorer.

In the present example, the user has selected all of the available tabs (using the checkbox in selection area 508) and selected the toggle all button 510. As a result, all of the tabs are displayed in a lower portion of the SBS UI 500. The user may then visually inspect the different tabs. While the example SBS UI 500 displays four of the retrieved tabs, more tabs may be displayed on the same screen. Alternatively, the tubs may be scrollable to allow the user to view more tabs than the screen area can provide. In another example, the user may select the toggle FireFox button 514, and only the screenshots (or tabs) obtained from a FireFox browser are displayed tor visual comparison.

Figure 6:
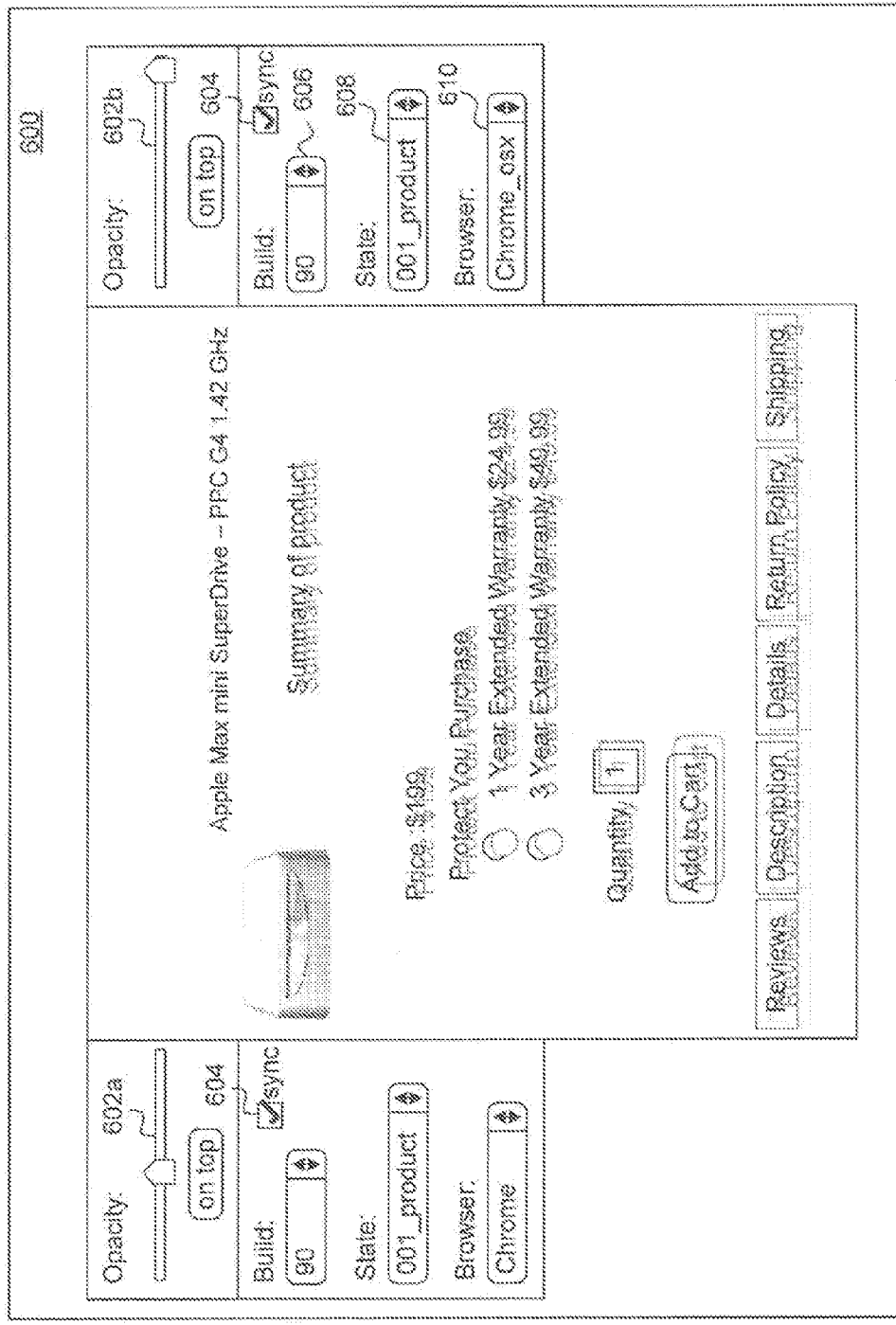
FIG. 6 is an example of an overlay visual comparison screenshot.

FIG. 6 is an example of an overlay visual comparison user interface 600 (herein referred to as the overlay UI). The overlay UI 600 displays one tab over another tab. An opacity slider 602 allows the user to see one tab darker, lighter, or equally the same as the other tab. As shown in FIG. 6, a first tab (e.g., Build #90, state 001_product, browser Chrome) is set at roughly half opacity using the opacity slider 602a. The second tab (e.g., Build #90, state 001_product, browser Chrome_osx) is set at full opacity using the opacity slider 602b. As a result, FIG. 6 shows the Chrome tab with lighter text than the Chrom_OSX tab. In the present example, the tabs do not line up perfectly. Instead, the text of the Chrome tab appears slightly below and to the right of the text for the Chrome_OSX tab. However, the product images and the product title for both tabs appear to be aligned.

As shown in FIG. 6, a synch button 604 allows the synching of tabs for different browsers. For example, FIG. 6 shows the tabs for the same build (Build #90) and same state (001_product), but different browsers (Chrome and Chrome OSX). Because the synch box 604 is checked, changing to the next state will automatically change both tabs to the next state (e.g., 002_cart). However, if the user does not want to keep the tabs synched, the user may uncheck one of the synch boxes 604. For example, the developer may want to compare Build #90 to Build #91 (e.g., by unsynching the two tabs and changing the build number in a build field 606) to see if changes go in or how much progress has been made between builds. Similarly, the state may be changed by changing the selection in a state field 608 or the browser may be changed by changing the selection in a browser field 610.

Figure 7:
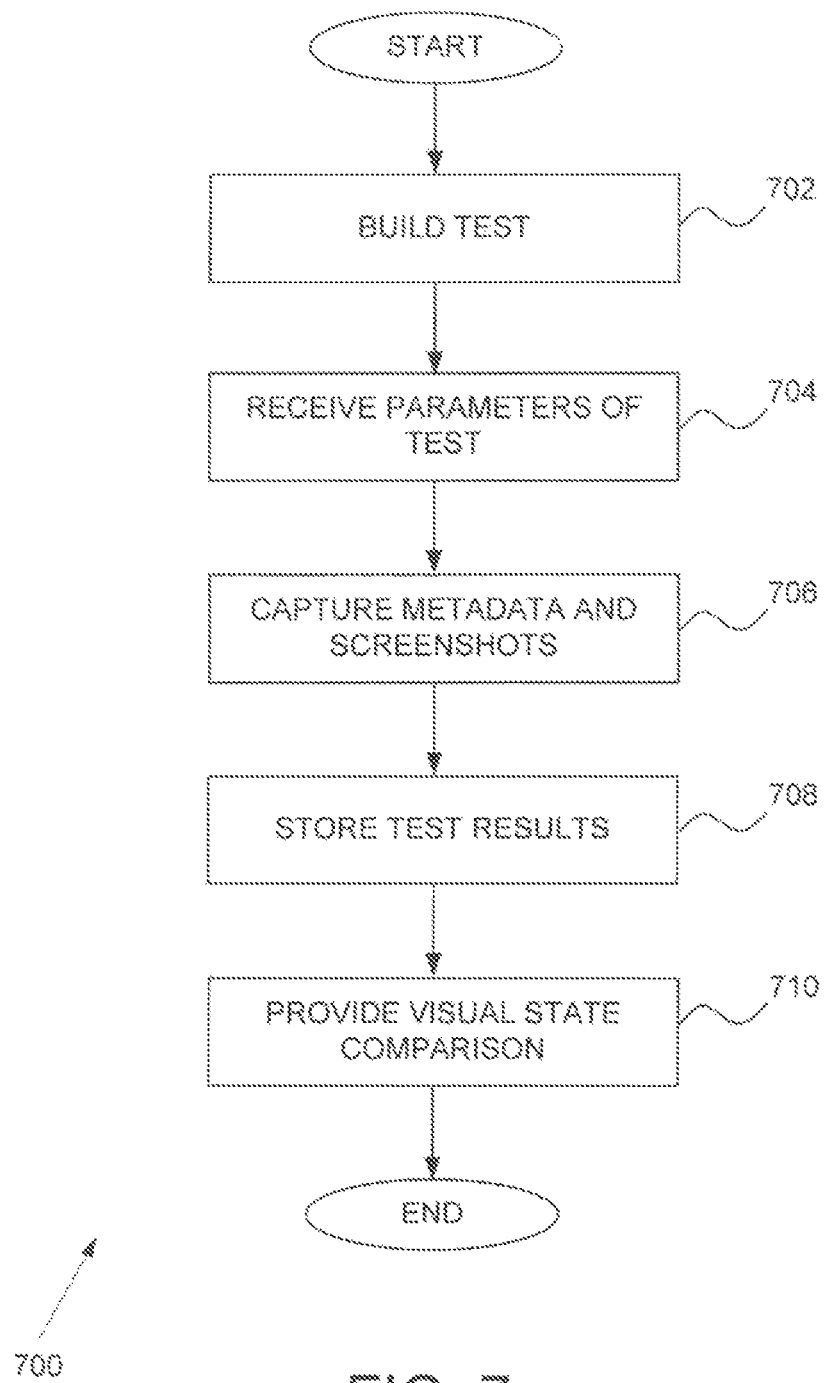
FIG. 7 is a flow diagram of an example high-level method for providing a visual state comparison.

FIG. 7 is a flow diagram of an example high-level method 700 for providing a visual state comparison. In operation 702, a test is built. In example embodiments, the test builder module 202 allows a user (e.g., developer or QA personnel) to create tests to be run against various web applications for different browsers and operating systems. In example embodiments, the user indicates steps in the test and parameters within the test that are both configurable and fixed. For example, a starting product URL may be indicated as a configurable parameter in a checkout process test. The test builder module 202 generates the test based on the user inputs. The test is then stored for later use.

In operation 704, parameters of a test are received. In example embodiments, a user selects the test and provides at least some configurable parameters in a user interface provided by the testing module 204. For example, the user may provide a start URL to the testing module 204 and indicates different browsers that the test is to be run against. The user may also provide a height and width of the browsers to be compared.

The testing module 204 receives the parameters and triggers the capture of the proper screenshots and metadata in operation 706. In example embodiments, the state capture module 206 captures screenshots of a particular page (e.g., state) of the web application being tested. The state capture module 206 may open a web page or software application in multiple configurations of operating systems and browsers, and captures screenshots for comparison so a developer or quality assurance engineer can see if the web page or software application is broken or misaligned on certain browsers. Similarly, the metadata capture module 208 captures metadata for each state of each browser. The metadata may be captured before and during the running of the test (e.g., while the state capture module 206 is capturing screenshots). The metadata for each state may include, for example, the URL, the browser being used, a build number, and an operating system. The captured screenshots and metadata are stored to a data store (e.g., data storage 112) by the metadata capture module 208 in operation 708.

Figure 8:
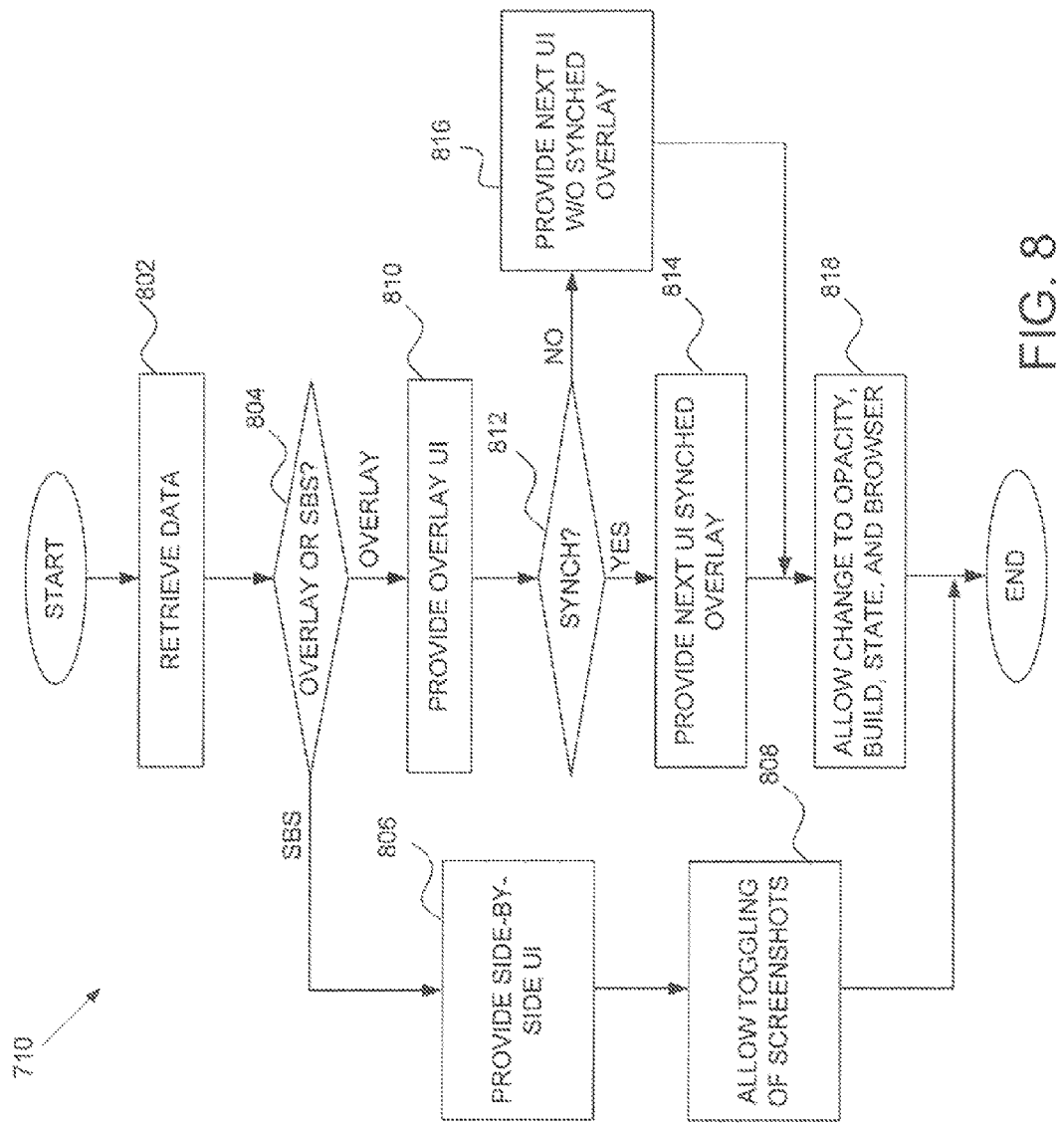
FIG. 8 is a flow diagram of a more detailed method for providing the visual state comparison.

At any time after the storing of the captured screenshots and metadata to the data store, the visual state comparison may be performed in operation 710. Referring now to FIG. 8, operation 710 is shown in more detail. Initially, a user provides parameters for the visual comparison. Based on the parameters provided to identify at least one test received by the report parameter module 302, the data retrieval module 304 retrieves the corresponding screenshots and metadata from the data store (e.g., data storage 112) in operation 802.

In operation 804, a determination is made as to whether the visual comparison should be displayed in an overlay or side-by-side visual comparison. Accordingly, one or more visual comparator modules 306 may make this determination based on a user input (e.g., selection of a corresponding button).

If the visual comparison is to be shown in a side-by-side format, then the screenshots are provided in a side-by-side UI in operation 806. In example embodiments, the SBS module 310 provides tabs for rendering in a side-by side visual comparison UI. The SBS module 310 may also provide various buttons on the user interface to allow the user to toggle between various tabs. Activation of one of the buttons will trigger toggling in operation 808.

If the visual comparison is to be shown in an overlay format, an overlay UI is presented in operation 810 by the overlay module 312. In operation 812, a determination of whether a next display should be synched is made. In one embodiment, the default is to synch the tabs. As such, the overlay module 312 provides overlay visual comparison tabs that are synched for rendering in a next overlay visual comparison user interface in operation 814. However, if the tabs are not to be synched, then a next UI is provided without synchronization in operation 816.

The overlay module 312 may also provide an opacity slider, build field, state field, and browser field to allow the user to adjust the opacity, build, state, and browser of a tab in comparison with another tab in operation 818. It is noted that operation 818 may occur at any time after the overlay UI is provided in operation 810. It is also noted that in one embodiment, a synch operation (similar to operation 812) may be applicable to the side-by-side UI. That is, for example, tabs in a side-by-side UI may be unsynched to show different builds or states. As such, the method 710 of FIG. 8 is merely an example, and operations may be optional, removed, added, or practiced in a different order.

Figure 9:
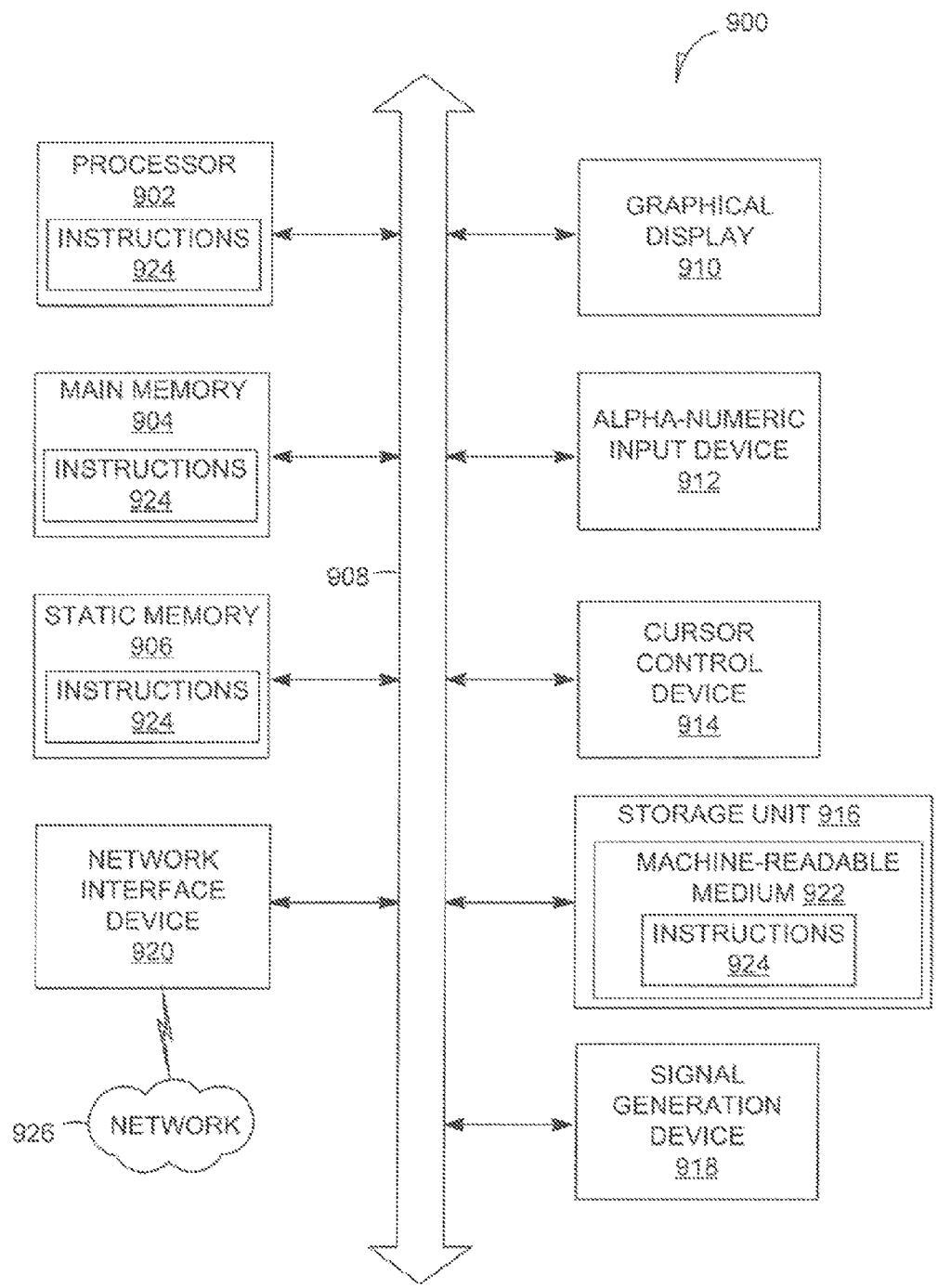
FIG. 9 is a simplified block diagram of a machine in an example form of a computing system within which a set of instructions for causing the machine to perform any one or more of the methodologies discussed herein may be executed.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system and within which instructions 924 (e.g., software, a program, an application, an applet, an app, or other executable code) for causing the machine 900 to perform any one or more of the methodologies discussed herein may be executed. In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a peer-to-peer (or distributed) network environment. The machine 900 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include a collection of machines that individually or jointly execute the instructions 924 to perform any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The machine 900 may further include a graphics display 910 (e.g., a plasma display panel (PDP), a light emitting diode (LED) display, a liquid crystal display (LCD), a projector, or a cathode ray tube (CRT)). The machine 900 may also include an alpha-numeric input device 912 (e.g., a keyboard), a cursor control device 914 (e.g., a mouse, a touchpad, a trackball, a joystick, a motion sensor, or other pointing instrument), a storage unit 916, a signal generation device 918 (e.g., a speaker), and a network interface device 920.

The storage unit 916 includes a machine-readable medium 922 on which is stored the instructions 924 embodying any one or more of the methodologies or functions described herein. The instructions 924 may also reside, completely or at least partially, within the main memory 904, within the processor 902 (e.g., within the processor's cache memory), or both, during execution thereof by the machine 900. Accordingly, the main memory 904 and the processor 902 may be considered as machine-readable media. The instructions 924 may be transmitted or received over a network 926 via the network interface device 920.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 900), such that the instructions, when executed by one or more processors of the machine (e.g., processor 902), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

The instructions 924 may further be transmitted or received over a communications network 926 using a transmission medium via the network interface device 920 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interlace (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in face, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, end data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
    building a test for a web application;
    running the test using different browser/operating system combinations to capture screenshots and corresponding metadata for the different browser/operating system combinations;
    receiving a modification to a header during the running of the test, the modification adjusting performance of a server when rendering a screenshot;
    receiving, from a user device of a user, parameters indicating the different browser/operating system combinations for a visual comparison of the screenshots of a state for the different browser/operating system combinations;
    based on the different browser/operating system combinations indicated by the parameters, retrieving the screenshots along with the corresponding metadata for each indicated browser/operating system combination; and
    causing, using a processor of a machine, a user interface that visually compares at least two retrieved screenshots to be provided to the user device, the user interface including a display of the corresponding metadata for the at least two retrieved screenshots.

2. The method of claim 1, wherein the causing of the user interface that visually compares comprises providing the at least two retrieved screenshots to be displayed in a side-by-side visual format.

3. The method of claim 2, further comprising providing checkboxes on the user interface for selection of a plurality of browser/operating system combinations to be displayed in the side-by-side format.

4. The method of claim 2, further comprising providing a plurality of toggle buttons on the user interface that allow the user to toggle between different screenshots in the side-by-side format.

5. The method of claim 1, wherein the causing of the user interface that visually compares comprises providing the at least two retrieved screenshots to be displayed in an overlay visual format.

6. The method of claim 5, further comprising providing an opacity slider that allows the user to adjust an opacity of a screenshot of the at least two retrieved screenshots.

7. The method of claim 5, further comprising providing fields that allow the user to change at least one selection from the group consisting of a build, the state, and a browser in order to change a screenshot to be displayed in the overlay visual format.

8. The method of claim 1, further comprising providing a synch button, wherein selection of the synch button synchronizes screenshots along a build and the state.

9. The method of claim 1, further comprising tracking errors during the capture of the screenshots, the errors being available for display on the user interface.

10. A machine-readable storage medium having no transitory signals and storing instructions which, when executed by the at least one processor, causes a machine to perform operations comprising:
    receiving, from a user device of a user, parameters indicating different browser/operating system combinations for a visual comparison of screenshots of a state for the different browser/operating system combinations;
    based on the different browser/operating system combinations indicated by the parameters, retrieving the screenshots along with corresponding metadata for each indicated browser/operating system combination;
    causing, using a processor of a machine, a user interface that visually compares at least two retrieved screenshots to be provided to the user device, the user interface including a display of the corresponding metadata for the at least two retrieved screenshots; and
    providing a synch button, selection of the synch button synchronizes screenshots along a build and the state.

11. The machine-readable storage medium of claim 10, wherein the causing of the user interface that visually compares comprises providing the at least two retrieved screenshots to be displayed in a side-by-side visual format.

12. The machine-readable storage medium of claim 10, wherein the causing of the user interface that visually compares comprises providing the at least two retrieved screenshots to be displayed in an overlay visual format.

13. The machine-readable storage medium of claim 12, wherein the operations further comprise providing an opacity slider that allows the user to adjust the opacity of a screenshot of the at least two retrieved screenshots.

14. The machine-readable storage medium of claim 10, wherein the operations further comprise tracking errors during the capture of the screenshots, the errors being available for display on the user interface.

15. The machine-readable storage medium of claim 10, wherein the operations further comprise:
    building a test for a web application; and
    running the test using the different browser/operating system combinations to capture the screenshots and the corresponding metadata for the different browser/operating system combinations.

16. The machine-readable storage medium of claim 15, wherein the operations further comprise receiving a modification to a header during the running of the test, the modification adjusting performance of a server when rendering a screenshot.

17. A system comprising:
    a report parameter module to receive, from a user device of a user, parameters indicating different browser/operating system combinations for a visual comparison of screenshots of a state for the different browser/operating system combinations;
    a data retrieval module to retrieve the screenshots along with corresponding metadata for each indicated browser/operating system combination based on the different browser/operating system combinations indicated by the parameters; and visual comparator modules, comprising a processor of a machine, to cause a user interface that visually compares at least two retrieved screenshots to be provided to the user device, the user interface including a display of the corresponding metadata for the at least two retrieved screenshots, the visual comparators modules to further provide a synch button, selection of the synch button synchronizes screenshots along a build and the state.

18. The system of claim 17, wherein the visual comparator modules comprise a side-by-side module to cause the at least two retrieved screenshots to be displayed in a side-by-side visual format.

19. The system of claim 17, wherein the visual comparator modules comprise an overlay module to cause the at least two retrieved screenshots to be displayed in an overlay visual format.

20. The system of claim 17, further comprising:
a test builder module to build a test for a web application;
one or more capture modules to run the test using the different browser/operating system combinations to capture the screenshots and the corresponding metadata for the different browser/operating system combinations; and
a modification module to receive a modification to a header during the running of the test, the modification adjusting performance of a server when rendering a screenshot.

\* \* \* \* \*